(12) United States Patent
Rohatgi et al.

(10) Patent No.: US 11,982,773 B2
(45) Date of Patent: *May 14, 2024

(54) LIDAR SENSOR VALIDATION

(71) Applicant: GM Cruise Holdings LLC, San Francisco, CA (US)

(72) Inventors: Ankit Rohatgi, San Francisco, CA (US); Peter Megson, San Francisco, CA (US); Mariana Rihl, San Francisco, CA (US); Adam Cadien, San Francisco, CA (US); Robert Vets, Seattle, WA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/110,686

(22) Filed: Feb. 16, 2023

(65) Prior Publication Data

US 2023/0296744 A1 Sep. 21, 2023

Related U.S. Application Data

(63) Continuation of application No. 16/543,242, filed on Aug. 16, 2019, now Pat. No. 11,609,315.

(51) Int. Cl.
*G01S 7/497* (2006.01)
*G01S 17/42* (2006.01)

(52) U.S. Cl.
CPC .......... *G01S 7/4972* (2013.01); *G01S 17/42* (2013.01); *B60W 2420/408* (2024.01)

(58) Field of Classification Search
CPC ... G01S 7/4972; G01S 17/42; B60W 2420/52
See application file for complete search history.

(56) References Cited

U.S. PATENT DOCUMENTS

| | | | |
|---|---|---|---|
| 11,609,315 B2* | 3/2023 | Rohatgi | G01S 17/931 |
| 2002/0087253 A1* | 7/2002 | Jeon | G06T 7/70 |
| | | | 180/170 |
| 2005/0062615 A1* | 3/2005 | Braeuchle | G01S 13/867 |
| | | | 340/903 |
| 2008/0023927 A1* | 1/2008 | Kim | B60G 17/0155 |
| | | | 280/5.514 |
| 2010/0250051 A1* | 9/2010 | Nestico | G05B 17/02 |
| | | | 701/100 |
| 2014/0368651 A1* | 12/2014 | Irschara | G06T 7/80 |
| | | | 348/148 |

(Continued)

*Primary Examiner* — Hussein Elchanti
(74) *Attorney, Agent, or Firm* — Michael DiCato

(57) ABSTRACT

Various aspects of the subject technology relate to a lidar validation system. The lidar validation system is configured to acquire one or more lidar point clouds from a lidar unit, wherein the lidar unit comprises one or more lasers, and wherein each point cloud is a representation of a scene according to a laser in the lidar unit, the scene comprising a fiducial target. The lidar validation system is configured to generate, based on points in the one or more point clouds, a target cloud that correspond to the fiducial target, perform a rigid body processing to minimize a sum of distances from each point in the target cloud to the fiducial target, and generate lidar validation measurements based on the distances from each point in the target cloud to the fiducial target.

20 Claims, 11 Drawing Sheets

(56) References Cited

U.S. PATENT DOCUMENTS

| | | | |
|---|---|---|---|
| 2014/0379254 A1* | 12/2014 | Miksa | G01C 21/30 701/450 |
| 2015/0291177 A1* | 10/2015 | Lee | B60W 40/06 73/146 |
| 2016/0253566 A1* | 9/2016 | Stein | G06T 7/13 348/148 |
| 2016/0356594 A1* | 12/2016 | Sorenson | G08G 1/161 |
| 2017/0019589 A1* | 1/2017 | Moon | H04N 5/145 |
| 2017/0088134 A1* | 3/2017 | Liu | G08G 1/165 |
| 2017/0124781 A1* | 5/2017 | Douillard | G08G 1/207 |
| 2017/0219338 A1* | 8/2017 | Brown | G01S 17/87 |
| 2018/0015801 A1* | 1/2018 | Mohamed | H04L 67/12 |
| 2018/0074506 A1* | 3/2018 | Branson | G01S 13/865 |
| 2018/0211455 A1* | 7/2018 | Dillow | G06Q 30/08 |
| 2018/0283861 A1* | 10/2018 | Kourogi | G01C 5/06 |
| 2019/0293772 A1* | 9/2019 | Pfeiffer | G05D 1/024 |
| 2019/0379806 A1* | 12/2019 | Zhang | H04N 23/80 |
| 2020/0081092 A1* | 3/2020 | Choi | G01S 13/32 |
| 2020/0099878 A1* | 3/2020 | Chen | H01L 27/14609 |
| 2020/0103920 A1* | 4/2020 | Castorena Martinez | G08G 1/166 |
| 2020/0282929 A1* | 9/2020 | Kroeger | G01S 7/497 |

* cited by examiner

FIG. 5

| Index | Lidar ID | Standard Deviation in Distance (m) First Return | Standard Deviation in Distance (m) Second Return |
|---|---|---|---|
| 0 | PA6430C3509330C353 | 0.0127 | 0.0129 |
| 1 | PA6431C3519331C352 | 0.0144 | 0.0145 |
| 2 | PA6432C6549032C657 | 0.0118 | 0.0119 |
| 3 | PA6438C8529238C851 | 0.0158 | 0.0158 |
| 4 | PA6438C9539238C950 | 0.0147 | 0.0149 |
| 5 | PA643CC45D953CC45F | 0.0139 | 0.0139 |
| 6 | PA643CC956933CC955 | 0.0143 | 0.0144 |
| 7 | PA643CCD52933CCD51 | 0.0144 | 0.0145 |
| 8 | PA643EC65D953EC65F | 0.0134 | 0.0134 |
| 9 | PA643EC852943EC851 | 0.0141 | 0.0142 |
| 10 | PA643ECD57943ECD54 | 0.0152 | 0.0152 |
| 11 | PA643FCE55943FCE56 | 0.0139 | 0.0140 |
| | Mean | 0.0140 | 0.0141 |

LIDAR SENSOR VALIDATION

CROSS-REFERENCE TO RELATED APPLICATIONS

This application is a continuation of and claims the benefit of U.S. application Ser. No. 16/543,242, filed on Aug. 16, 2019, entitled LIDAR SENSOR VALIDATION, which is expressly incorporated by reference herein in its entirety.

TECHNICAL FIELD

The present invention generally pertains to sensor units and, more specifically, to validating lidar units use for various applications, including for use in automotive vehicles.

BACKGROUND

Light detection and ranging (lidar) sensors are used in a wide variety of applications and involve illuminating the target with laser light and measuring the reflected light with a sensor. The laser return times and wavelengths are then used, for example, to determine the distance of a target and/or make digital 3-D representations of the target. These lidar sensors are associated with extrinsic parameters and intrinsic parameters. Extrinsic parameters describe the pose (i.e., position and orientation) of a lidar sensor with respect to an external frame of reference. For example, extrinsic parameters may relate to how a lidar sensor is installed and its position with respect to other sensors or frames of reference. Intrinsic parameters are associated with characteristics that do not depend on the outside world and how the sensor is placed in it. The intrinsic parameters may relate to parameters internal to the lidar sensor such as the various components, configuration, and characteristics of the lidar sensor.

One area in which lidar sensors are being increasingly used is in vehicles such as automobiles. Vehicles of various types operate in a wide variety of environmental conditions. These vehicles increasingly include and rely on various sensors such as lidar sensors to aid in vehicular operation and navigation. In addition to lidar sensors, the sensors used in vehicles may also include cameras or radio detection and ranging (radar) sensors. Lidar sensors are particularly useful in autonomous vehicle technology. Although a number of manufacturers produce lidar sensors, these lidar sensors have varying degrees of accuracy, consistency, and build quality.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 5 is a chart illustrating lidar validation measurements for a group of lidar units, in accordance with various aspects of the subject technology.

DETAILED DESCRIPTION

Figure 1:
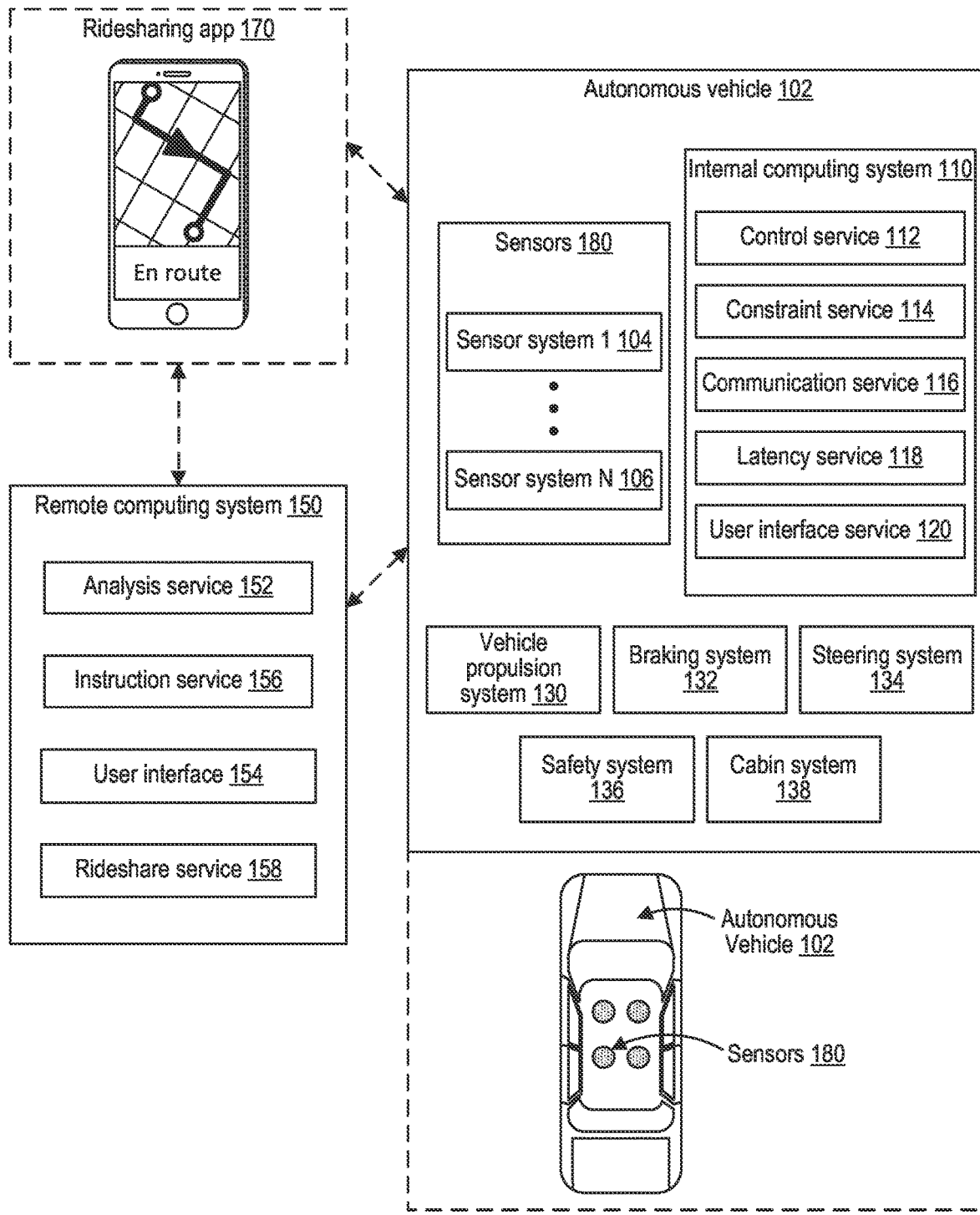
FIG. 1 illustrates an autonomous vehicle and remote computing system architecture, in accordance with various aspects of the subject technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

Lidar sensors are manufactured with varying degrees of accuracy, consistency, and build quality. Even different examples of a single model of lidar sensor produced by a specific manufacturer may have variations with respect to accuracy, consistency, and other intrinsic characteristics of the lidar sensors. In applications such as autonomous vehicle technologies where accuracy, consistency, and reliability of data are paramount to the safe and predictable operation of an autonomous vehicle, it is crucial that the type of lidar sensor selected for use on a fleet of vehicles is validated and meets acceptable performance standards. Furthermore, each lidar sensor installed on a vehicle in the fleet should also be validated in case there is inconsistency across lidar sensors of a particular type.

Aspects of the subject technology systems and methods for validating one or more lidar sensors. Based on validation measurements that are generated, various lidar sensors may be compared to determine whether a preferred lidar sensor or determine whether a lidar sensor is adequate for use on a vehicle. For example, based on the validation measurements, a make and model of lidar sensor may be selected for use. Alternatively or additionally, one or more units of lidar sensors of a particular make and model may be selected for installation while others that do not meet standards may be remain unused and/or returned to the manufacturer.

By generating objective validation measurements, various aspects of the subject technology enable only validated lidar sensors to be used, thereby increasing the overall accuracy, consistency, and quality of the lidar sensors used. Furthermore, the validated lidar sensors provide an increased confidence that the lidar sensors will perform as intended. These are especially important in applications where the performance of lidar sensors is critical. One such application is in the field of autonomous vehicles, where the performance of lidar sensors is critical to functions such as identifying objects, performing vehicle maneuvers, ensuring passenger safety, among others. Autonomous vehicles typically rely heavily on lidar sensors and satisfactory operation of these sensors is of critical importance.

Various embodiments of the subject technology are discussed with respect to lidar sensors used in autonomous vehicles for illustrative purposes. Other embodiments may relate to other types and uses of lidar sensors. These embodiments may be used in various fields and for various purposes.

FIG. 1 illustrates an autonomous vehicle and remote computing system architecture, in accordance with various aspects of the subject technology. The autonomous vehicle 102 can navigate about roadways with or without a human driver based upon sensor signals output by sensor systems 180 of the autonomous vehicle 102. The autonomous vehicle 102 includes a plurality of sensor systems 180 (a first sensor system 104 through an Nth sensor system 106). The sensor systems 180 are of different types and are arranged about the autonomous vehicle 102. For example, the first sensor system 104 may be a camera sensor system and the Nth sensor system 106 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it should be understood that more or fewer sensors may be coupled to the autonomous vehicle 102.

Note that while the sensors 180 of the vehicle 102 of FIG. 1 are illustrated as uniform and as mounted or otherwise coupled to the roof of the vehicle 102, different types of sensors 180 may be used, and different sensors 180 may be positioned along, or coupled to, different portions of the vehicle 102. For example, one or more sensors may be coupled to the left and right side/wing/door/fender mirrors of the vehicle 102, respectively, while one or more central sensors may be coupled to or hidden behind a front bumper of the vehicle 102. Some sensors 180 may be located along or coupled to the interior of the vehicle, for example behind the windshield or to the interior rear-view mirror. The vehicle 102 may have sensors located along the roof, doors, walls, windows, bumpers, anywhere along the top and/or bottom and/or front and/or left side and/or right side and/or rear of the vehicle, or any combination thereof.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. In some cases, the braking system 132 may charge a battery of the vehicle through regenerative braking. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 180 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 180 and human co-pilots, etc.

The internal computing system 110 can include a control service 112 that is configured to control operation of the vehicle propulsion system 130, the braking system 208, the steering system 134, the safety system 136, and the cabin system 138. The control service 112 receives sensor signals from the sensor systems 180 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 4G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations. The internal computing system 110 can, in some cases, include at least one computing system, or may include at least a subset of the components discussed with respect to computing systems.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

The rideshare service 158 as depicted in FIG. 1 illustrates a vehicle 102 as a triangle en route from a start point of a trip to an end point of a trip, both of which are illustrated as circular endpoints of a thick line representing a route traveled by the vehicle. The route may be the path of the vehicle from picking up the passenger to dropping off the passenger (or another passenger in the vehicle), or it may be the path of the vehicle from its current location to picking up another passenger. The remote computing system 150 can, in some cases, include at least one computing system or may include at least a subset of the components discussed with respect to computing systems.

As noted above, various components of the autonomous vehicle 102 and the remote computing system 150 may rely on data from lidar sensors on the autonomous vehicle 102. Aspects of the subject technology provide for the generation of lidar validation measurements. According to some embodiments, a validation system may be configured to acquire one or more point clouds from a lidar unit. The lidar unit may include a number of lasers and each point cloud may be a representation of a scene according to a laser in the lidar unit. The validation system selects points in the one or more point clouds that correspond to a fiducial target in the scene to generate a target cloud and fits the target cloud to a geometric representation of the fiducial target. Based on the distances from each point in the target cloud to the fiducial target, the validation system can generate one or more lidar validation measurements.

Figure 2:
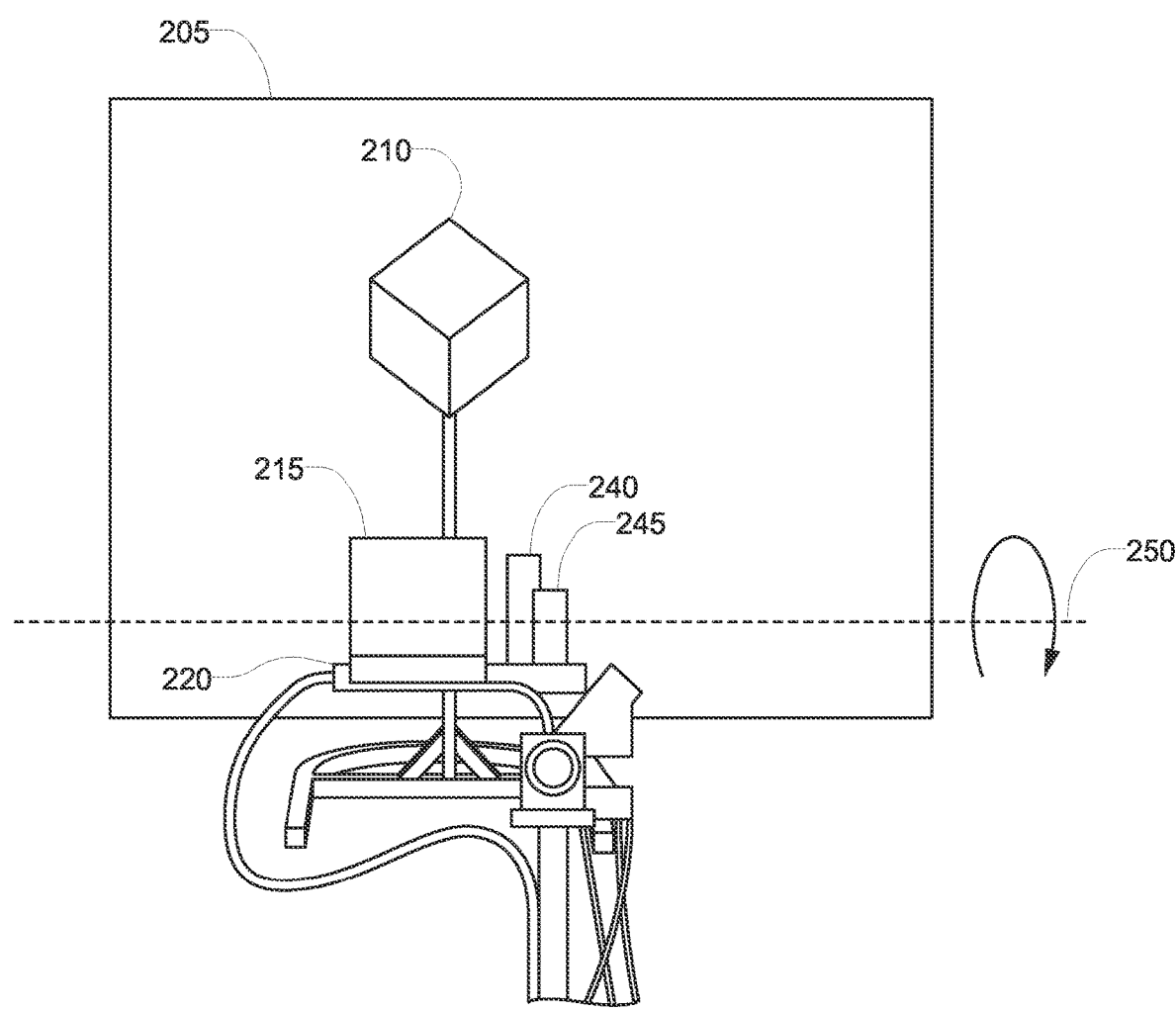
FIG. 2 is a diagram illustrating an example environment for lidar sensor validation, in accordance with various aspects of the subject technology.

FIG. 2 is a diagram illustrating an example environment for lidar sensor validation, in accordance with various aspects of the subject technology. In particular, the environment illustrated in FIG. 2 may be used for acquiring lidar sensor data used to validate one or more lidar sensor units. The example environment may include a scene 205 that includes a fiducial target 210 or other visual marker. The scene 205 may include a simple backdrop that allows the fiducial target 210 to be identified based on lidar sensor data. Although the fiducial target 210 may come in various size, shape, and orientations, in FIG. 2, the fiducial target 210 is shown as a cube or box with six faces being held in position on a stand. In other embodiments, the fiducial target may include, for example, parallelograms, spheres, ellipsoids, prisms, cylinders, pyramidal shapes, objects with a number (e.g., 3) of orthogonal faces or planes, or other object of known size and shape that may be detected by a lidar sensor. Although the fiducial target 210 shown in FIG. 2 is of a box-like shape with orthogonal faces, other types of fiducial targets do not need to be strictly orthogonal and may include faces that are otherwise not parallel (e.g., the faces belong to planes that intersect).

The example environment of FIG. 2 also includes a lidar sensor 215 mounted on a platform 220 that enables the lidar sensor 215 to operate and survey the scene 205. Various types of lidar sensors may be validated based on the disclosed technology. For example, revolving-head dimensional (3D) lidar sensor units, mirrorless lidar sensor units, and/or other types of lidar units may be used. In some embodiments, the lidar sensor 215 may include one or more arrays of lasers (or other photon emitters, illumination source, or the like) configured to emit a laser beam or other measurement pulse. In some cases, the lidar sensor 215 or portions of it may be configured to rotate the one or more arrays of lasers to survey the scene 205. The lidar sensor 215 may also include a detector configured to detect return pulses of light and generate lidar sensor data (e.g., location, distance, intensity, frequency, etc.) based on the return pulses of light. In some cases, multiple return pulses (e.g., returns) per emitted beam may be detected based on the scene 205.

The lidar sensor data may be converted into or otherwise represented by a point cloud in 3 dimensional (3D) space. A validation system may be configured to acquire one or more point clouds from the lidar sensor 215 and filter for the points in the one or more point clouds that correspond to the fiducial target 210 in the scene 205 to generate a target cloud and fits the target cloud to a geometric representation of the fiducial target. Based on the distances from each point in the target cloud to the fiducial target 210, the validation system can generate one or more lidar validation measurements. The validation system may be implemented as one or more computing devices in the example environment of FIG. 2, one or more remote computing devices, a computing device in communication with the lidar sensor 215 and the other components of the example environment of FIG. 2, or a combination.

For thoroughness, it may be desirable to obtain lidar sensor data corresponding to the fiducial target 210 from each laser of the one or more laser arrays of the lidar sensor 215. However, the field of view of the lidar sensor 215 may be quite large such that in some lidar sensor validation environments, not all lasers in each laser array of the lidar sensor 215 may hit the fiducial target 210. To address this, an enormous fiducial target 210 may be used. However, in some cases, the size of the fiducial target 210 needed to cover the entire field of view of the lidar sensor 215 may be impractical.

Accordingly, some aspects of the subject technology provide for a lidar sensor data acquisition process where the lidar sensor 215 is rotated a number of times such that each laser in each array of lasers in the lidar sensor 215 are able to obtain lidar sensor data corresponding to the fiducial target 210. For example, the example environment of FIG. 2 includes a motor 240 configured to rotate the platform 220 and the lidar sensor 215 about an axis 250. An encoder 245 is configured to specify the position of the motor 240 and the angle of rotation of the platform 220 and the lidar sensor 215 about the axis 250. The position of the motor 240 and the angle of rotation may be used by the validation system to associate with lidar sensor data obtained for each laser. Accordingly, a point cloud can be generated for each laser in the lidar sensor 215 where the point cloud includes at least some points that correspond with the fiducial target 210.

In an example data acquisition process, the validation system may receive a calibration file associated with the lidar sensor 215 being validated. The calibration file for the lidar sensor 215 may include information about the elevation angles of the lasers in the one or more arrays of lasers in the lidar sensor 215 and/or the field of view of the lidar sensor 215. Based on the calibration file, the validation system may identify one or more angles to rotate the lidar sensor 215. The validation system may send instructions to the motor 240 and/or encoder 245 that causes the motor 240 to rotate the platform 220 and the lidar sensor 215 to a first position and/or angle. At the first position and/or angle, the lidar sensor 215 may be instructed to obtain one or more sets of lidar sensor data from one or more lasers on the lidar sensor 215. After lidar sensor data from the first position and/or angle is obtained, the motor 240 may rotate the platform 220 and the lidar sensor 215 to a second position and/or angle, where the lidar sensor 215 may obtain one or more additional sets of lidar sensor data. This process may continue across a number of other positions and/or angles until lidar sensor data corresponding to the fiducial target 210 is obtained from each laser in each array of lasers in the lidar sensor 215.

Figure 3:
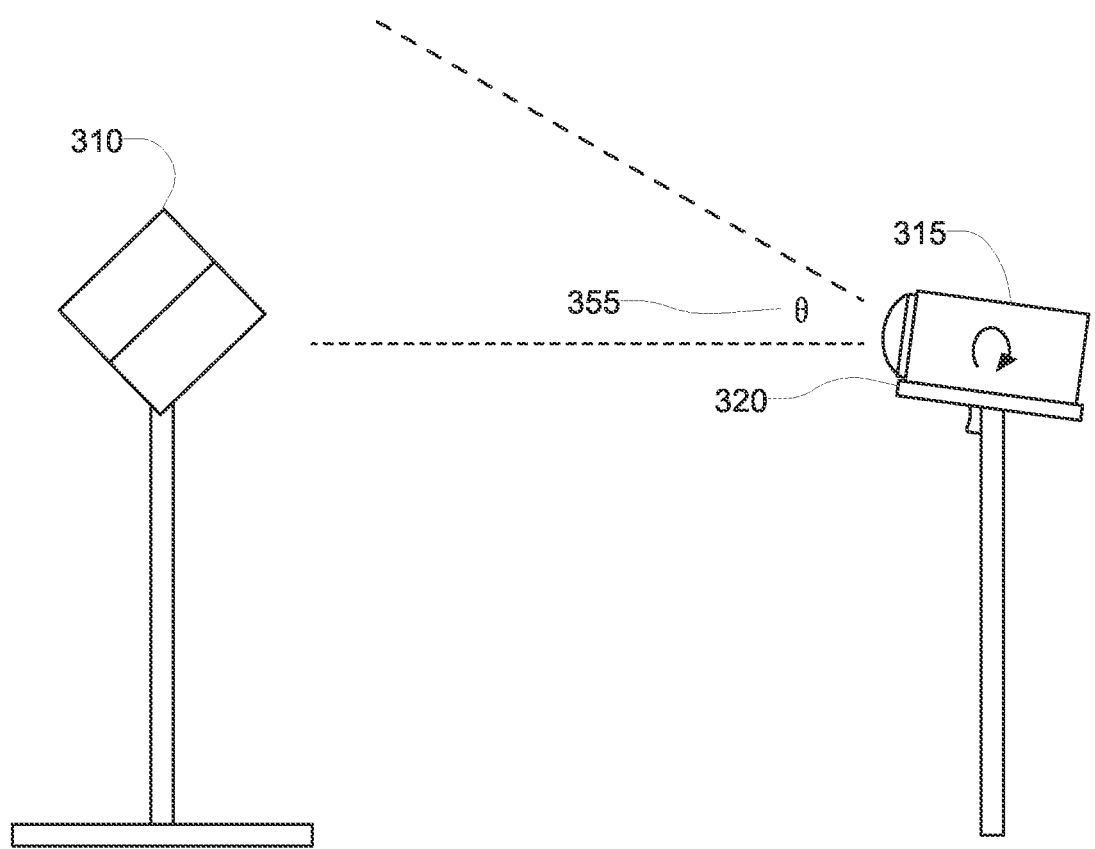
FIG. 3 is a diagram illustrating a side view of an example environment for lidar sensor validation, in accordance with various aspects of the subject technology.

FIG. 3 is a diagram illustrating a side view of an example environment for lidar sensor validation, in accordance with various aspects of the subject technology. In particular, the environment illustrated in FIG. 3 may be used for acquiring lidar sensor data used to validate one or more lidar sensor units. The example environment may include a fiducial target 310 or other visual marker. In FIG. 3, the fiducial target 310 is shown as a cubical object with six faces being held in position on a stand. In other embodiments, the fiducial target may include, for example, parallelograms, spheres, ellipsoids, prisms, cylinders, pyramidal shapes, objects with a number (e.g., 3) of orthogonal faces or planes, or other object of known size and shape that may be detected by a lidar sensor. A lidar sensor 315 mounted on a platform 320 that enables the lidar sensor 315 to operate and survey the fiducial target 310.

As noted above, a validation system may identify one or more angles to rotate the lidar sensor 315 based on a calibration file for the lidar sensor 315. The validation system may send instructions to the motor and/or encoder that causes the motor to rotate the platform 320 and the lidar sensor 315 to a first position and/or angle 355. At the first position and/or angle 355, the lidar sensor 315 may be instructed to obtain one or more sets of lidar sensor data from one or more lasers on the lidar sensor 315. After lidar sensor data from the first position and/or angle is obtained, the motor may rotate the lidar sensor 315 to a second position and/or angle, where the lidar sensor 315 may obtain one or more additional sets of lidar sensor data. This process may continue across a number of other positions and/or angles until lidar sensor data corresponding to the fiducial target 310 is obtained from each laser in each array of lasers in the lidar sensor 315. The lidar sensor data may be converted into or otherwise represented by a point cloud in 3 dimensional (3D) space.

Figure 4:
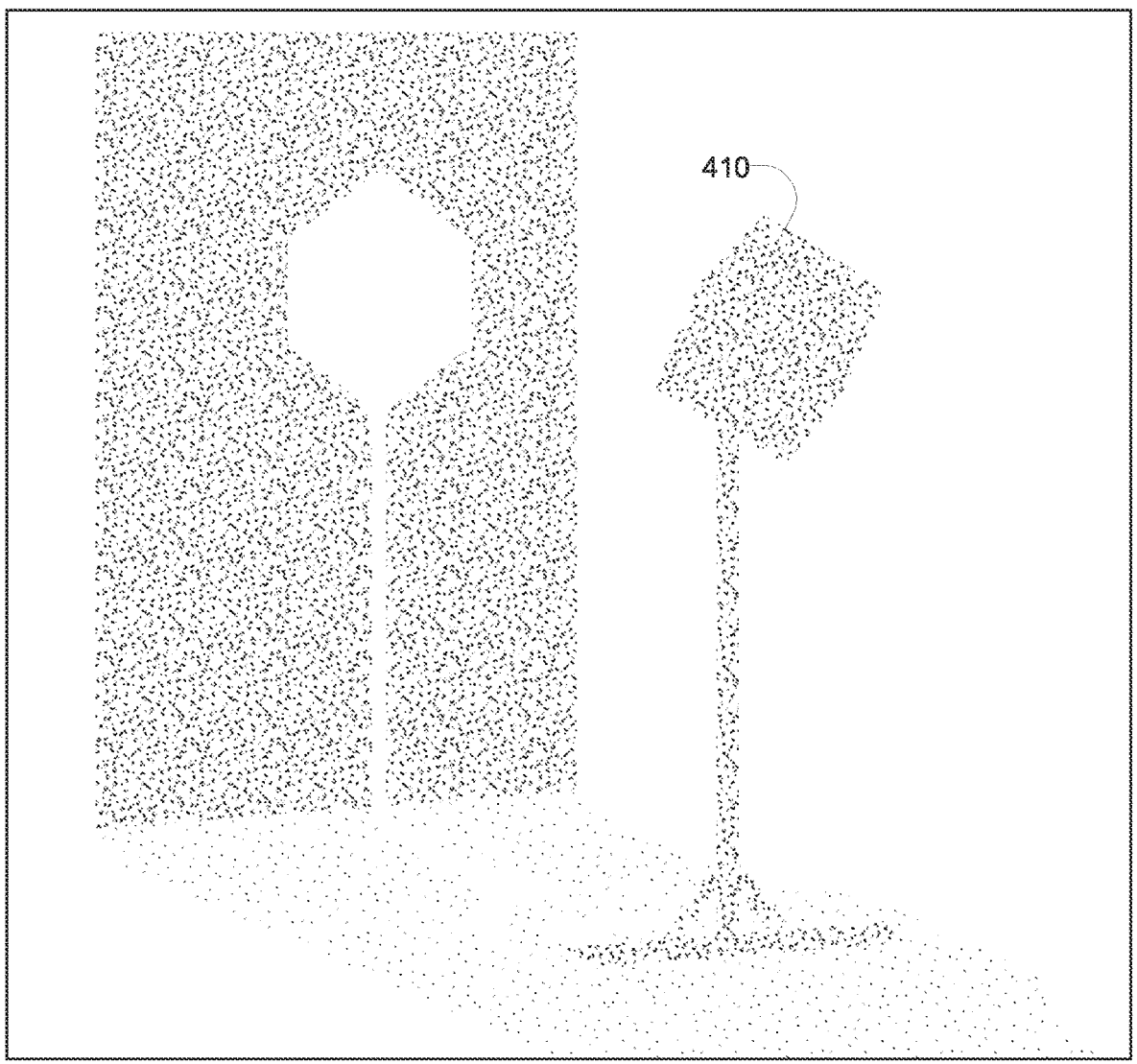
FIG. 4 is a diagram illustrating a point cloud generated based on lidar sensor data, in accordance with various aspects of the subject technology.

FIG. 4 is a diagram illustrating a point cloud generated based on lidar sensor data, in accordance with various aspects of the subject technology. The point cloud is a representation of the lidar sensor data obtained by the validation system in 3D space, but need not be actually produced as illustrated in FIG. 4. Each point in the data cloud represents a data point in the lidar sensor data. As illustrated in FIG. 4, the point cloud may include points for a lidar sensor's entire field of view. To filter out points in the point cloud that may not be useful for validation purposes, the validation system may select points that correspond to the fiducial target in the point cloud to generate a target cloud 410.

After the target cloud 410 is identified, the validation system may fit the target cloud to a geometric representation of the fiducial target using one or more rigid body process that may include one or more rigid body operations (e.g., translations, rotations, or the like) in six degrees of freedom in three-dimension (3D) space. The rigid body operations may be optimized to minimize a sum of distances from each point in the target cloud to the fiducial target.

While some aspects of the subject technology relate to concepts that may include mathematical components, these concepts are integrated into practical applications that impose limits. These mathematical components are not monopolized by these aspects of the subject technology as there are a wide variety of other uses for them. Furthermore, the mathematical components discussed herein are for illustrative purposes and other implementations are also applicable.

The optimization to minimize a sum of distances from each point in the target cloud to the fiducial target may be illustrated with reference to the fiducial target 210 of FIG. 2 and the target cloud 410 of FIG. 4. In FIG. 2, the fiducial target 210 is of a known size and shape and, in the example of FIG. 2, is embodied as a cubical or box-like object with 3 orthogonal faces. The target cloud 410 of FIG. 4 results from a lidar sensor going through the data acquisition process and corresponds to the fiducial target 210 of FIG. 2. Fitting the target cloud 410 to the geometric representation of fiducial target 210 may be approached by the validation system as a rigid body process that includes operations that can be represented as a vector:

$$\vec{x} = (t_x, t_y, t_z, r, p, y)$$

where $t_x$ is a translation operation in an x axis, $t_y$ is a translation operation in a y axis, $t_z$ is a translation operation in a z axis, r is a rolling rotational value, p is a pitching rotational value, and y is a yawing rotational value.

The validation system may identify a vector that attempts to minimize the overall distance between each point in the target cloud to the fiducial target, which may be represented in the by the function:

$$\min_{\vec{x}} \sum_i \|d_i\| \text{ where } d_i = \min\{d_{1i}, d_{2i}, d_{3i}\}$$

where $d_{ji}$ is the distance of the ith point from the jthe face. The fiducial target 210 of FIG. 2 has 3 orthogonal faces.

Once a vector is identified and the distances $d_{ji}$ from each point in the target cloud to the fiducial target are calculated, the validation system can generate lidar validation measurements based on the distances $d_{ji}$. A wide variety of lidar validation measurements may be computed, displayed, used to generate additional insights, or used perform an action. These lidar validation measurements are computed based on the distance measurements of each point in the target cloud to the fiducial target. In many cases, the number of distance measurements is quite large. Accordingly, various aspects of the subject technology relate to generating lidar validation measurements that help to provide additional insights into the distance measurements.

Various different lidar validation measurements and insights may be generated by the validation system. Furthermore, various actions may be taken based on the generated lidar validation measurements and insights. FIGS. 5-10 provide some non-limiting examples.

FIG. 5 is a chart illustrating lidar validation measurements for a group of lidar units, in accordance with various aspects of the subject technology. More specifically, FIG. 5 shows lidar validation measurements for 12 lidar units. Each row shows lidar validation measurements for a particular lidar unit. In some cases, multiple return pulses (e.g., returns) may be detected per emitted pulse beam. Different lidar validation measurements may be calculated per emitted pulse beam. For example, all first return pulses across all lasers for a lidar unit may be aggregated to a first return point cloud for the lidar unit and all second return pulses across all lasers for the lidar unit may be aggregated to a second return point cloud for the lidar unit. For each point cloud associated with a particular lidar unit, points in the point cloud corresponding the fiducial target are selected for inclusion in the target cloud, the target cloud is fitted to a geometric representation of the fiducial target, and distances from each point in the target cloud to the fiducial target are calculated either as part of the fitting process or as a separate operation. A standard deviation and/or mean may then be calculated for a first return and a second return as seen in FIG. 5.

The lidar validation measurements may be calculated for multiple different lidar units and used to compare lidar units, compare lidar makes and models, and/or identify an expected performance metric for lidar units, makes, or models. For example, in FIG. 5, all 12 lidar units are of the same make and model. Accordingly, the validation system can generate lidar validation measurements that may be used to identify, among other things, better lidar units for use, lidar units that do not meet a standard for return to a manufacturer, or expected performance metrics for the make and model of lidar unit. In other embodiments, the validation system may compute lidar validation measurements for lidar units of different makes, models, or types. These lidar validation measurements may be used to compare one make, model, or type of lidar unit with other make, models, or types.

Figure 6:
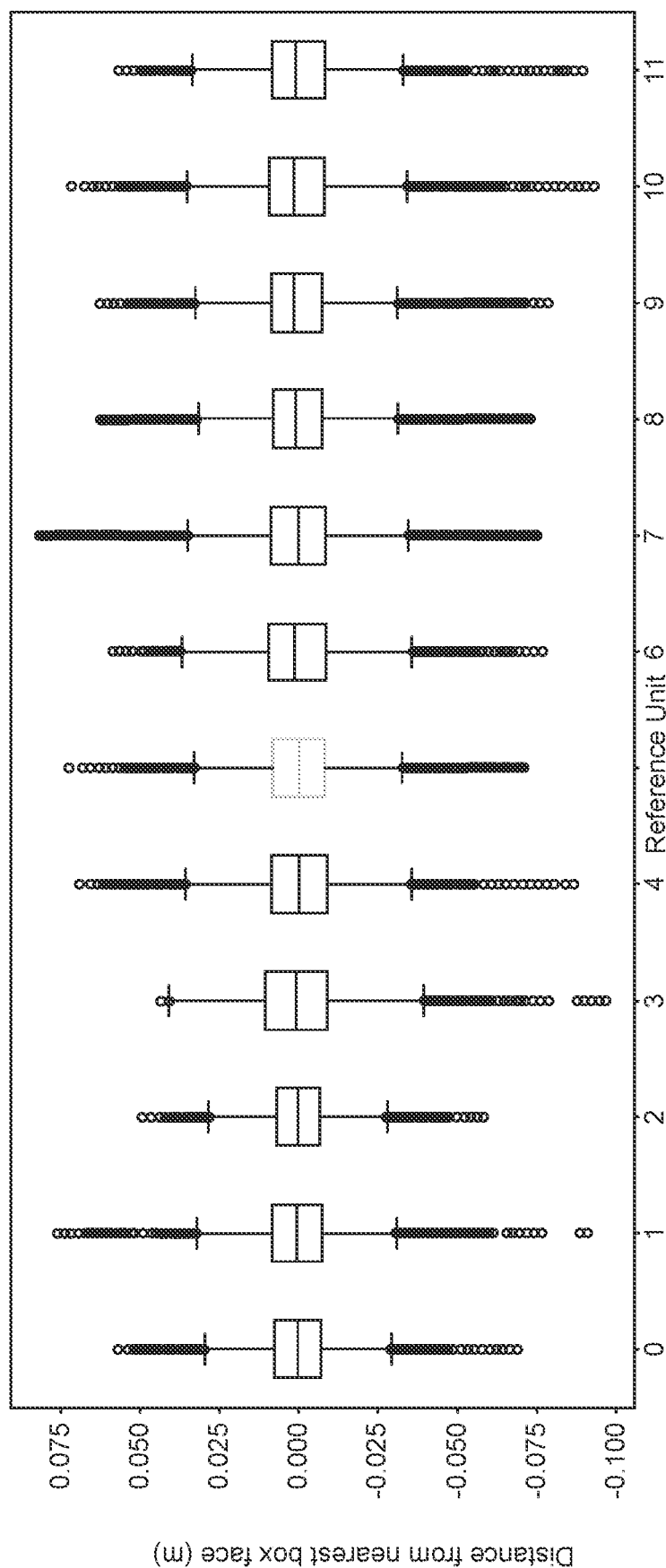
FIG. 6 is a chart illustrating lidar validation measurements for a group of lidar units, in accordance with various aspects of the subject technology.

FIG. 6 is a chart illustrating lidar validation measurements for a group of lidar units, in accordance with various aspects of the subject technology. More specifically, FIG. 6 shows lidar validation measurements for 12 lidar units. Each column of the chart provides a box plot for a particular lidar unit of the distances from each point in the lidar unit's target cloud to the fiducial target. The lidar validation measurements may be used to compare lidar units, compare lidar makes and models, and/or identify an expected performance metric for lidar units, makes, or models.

Figure 7:
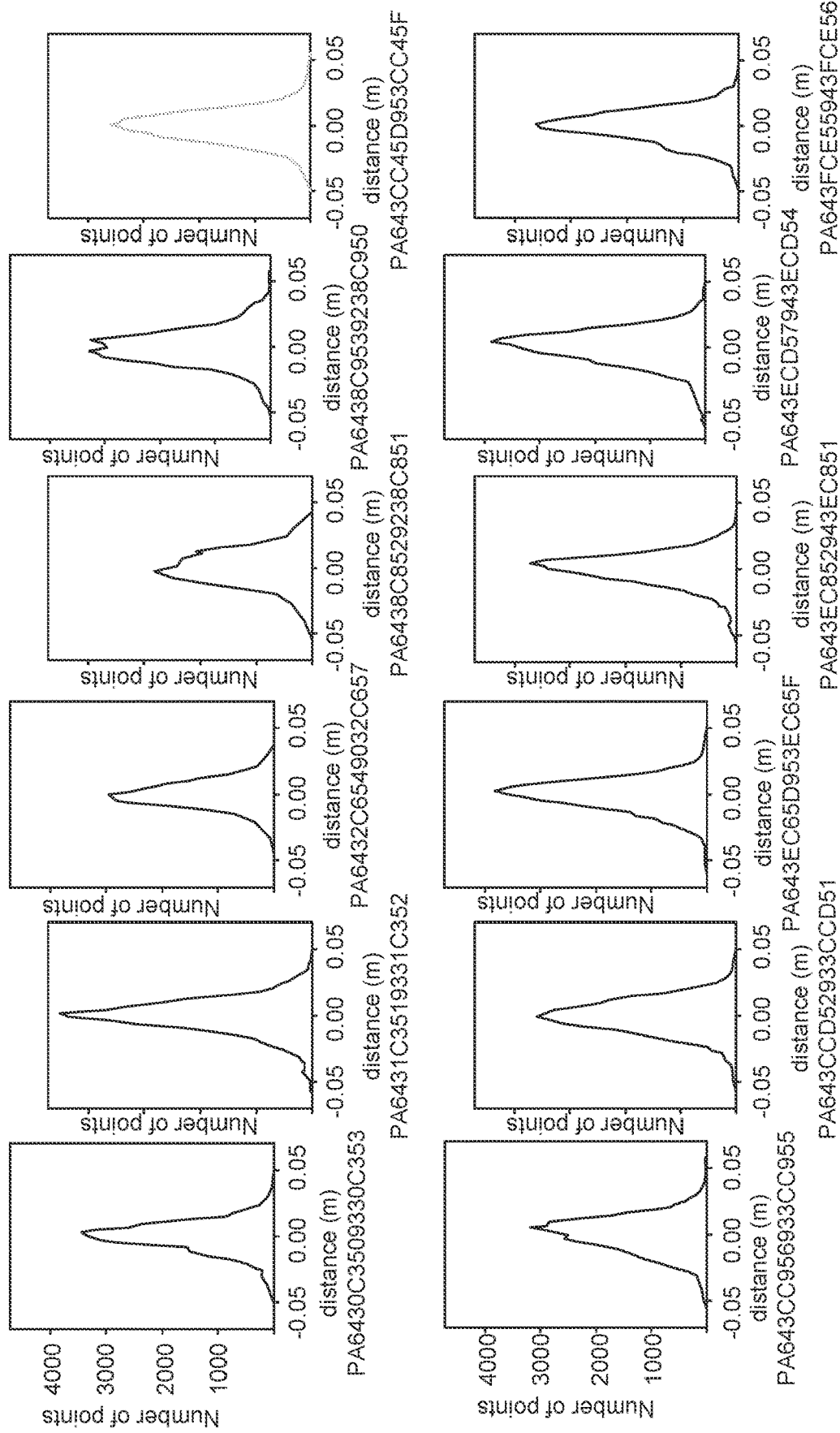
FIG. 7 is a diagram comprising a chart for each lidar unit in a group of lidar units, in accordance with various aspects of the subject technology.

FIG. 7 is a diagram comprising a chart for each lidar unit in a group of lidar units, in accordance with various aspects of the subject technology. Each chart for a lidar unit provides a representation of the distances from each point in the lidar unit's target cloud to the fiducial target.

Figure 8:
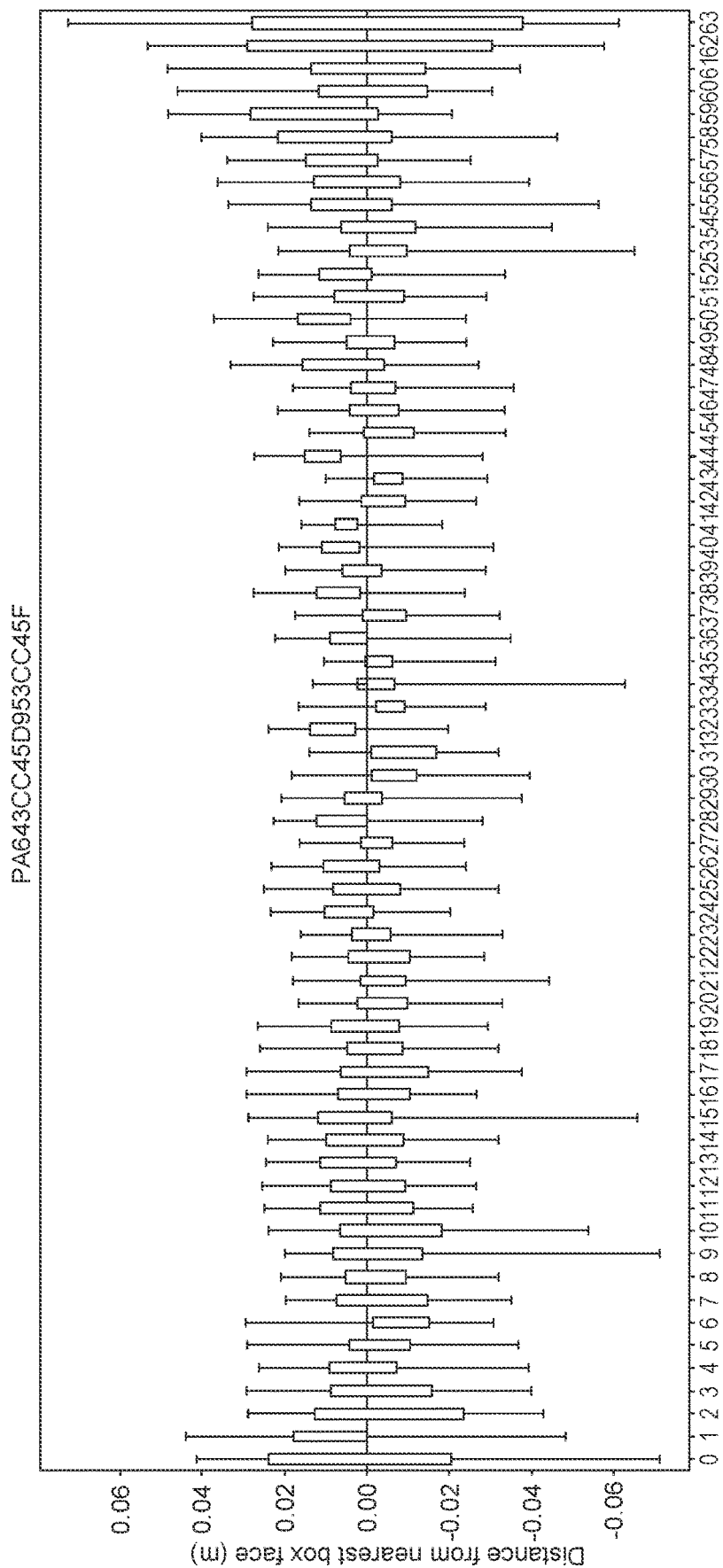
FIG. 8 is a chart illustrating lidar validation measurements for a lidar unit, in accordance with various aspects of the subject technology.

FIG. 8 is a chart illustrating lidar validation measurements for a lidar unit, in accordance with various aspects of the subject technology. According to some embodiments, instead of aggregating lidar sensor data across all lasers for a lidar unit, lidar sensor data for each laser in the lidar unit may be processed separately and be used to generate lidar validation measurements per laser in the lidar unit. For example, lidar sensor data for each laser may be used to generate a laser point cloud for the laser. Points in the laser point cloud corresponding the fiducial target are selected for inclusion in the target cloud, the target cloud is fitted to a geometric representation of the fiducial target, and distances from each point in the target cloud to the fiducial target are calculated either as part of the fitting process or as a separate operation. Each column of FIG. 8 shows a box plot for a particular laser in the lidar unit. As shown in FIG. 8, there are 64 lasers associated with the lidar unit. The box plot is a representation of the distances from each point in the laser's target cloud to the fiducial target. The lidar validation measurements may be used to compare lasers within a lidar unit and compare how one or more lasers compare with other lasers in the lidar unit.

Multiple charts such as the chart illustrated in FIG. 8 may also be generated for other lidar units and/or groups of lidar units (e.g., a group of lidar units of the same type). These charts may be used to compare different lidar units at a per laser level. For example, it may be discovered that the top and/or bottom lasers of a lidar unit perform more poorly than a middle group of lasers of the lidar unit. Furthermore, it may be discovered that another lidar unit performs better at the bottom end, middle, or top end than the lidar unit. Per beam lidar sensor data may be aggregated across a number of different lidar units of different types (e.g., make and models) to determine whether one type of lidar unit generally performs better or worse than another type of lidar unit and which lasers or section of lasers perform better or worse.

Figure 9:
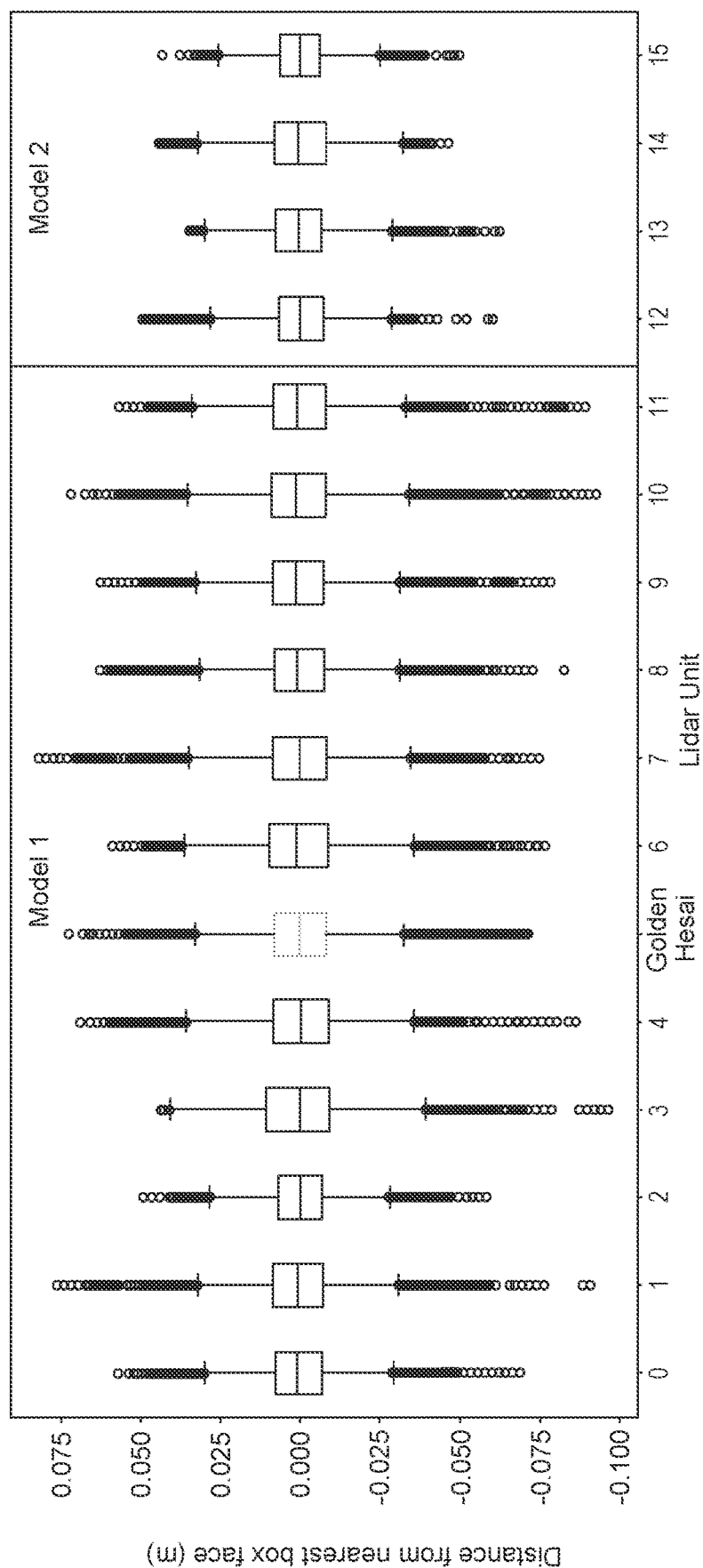
FIG. 9 is a chart illustrating lidar validation measurements for two types of lidar units, in accordance with various aspects of the subject technology.

FIG. 9 is a chart illustrating lidar validation measurements for two models of lidar units, in accordance with various aspects of the subject technology. More specifically, FIG. 9 shows lidar validation measurements for 16 lidar units. Each of the lidar units belong to one of two models (or types). For example, the first 12 lidar units are of a first model and the last 4 lidar units are of a second model. Each column of the chart provides a box plot for a particular lidar unit of the distances from each point in the lidar unit's target cloud to the fiducial target. The lidar validation measurements may be used to compare lidar units, compare lidar makes and models, and/or identify an expected performance metric for lidar units, makes, or models.

Figure 10:
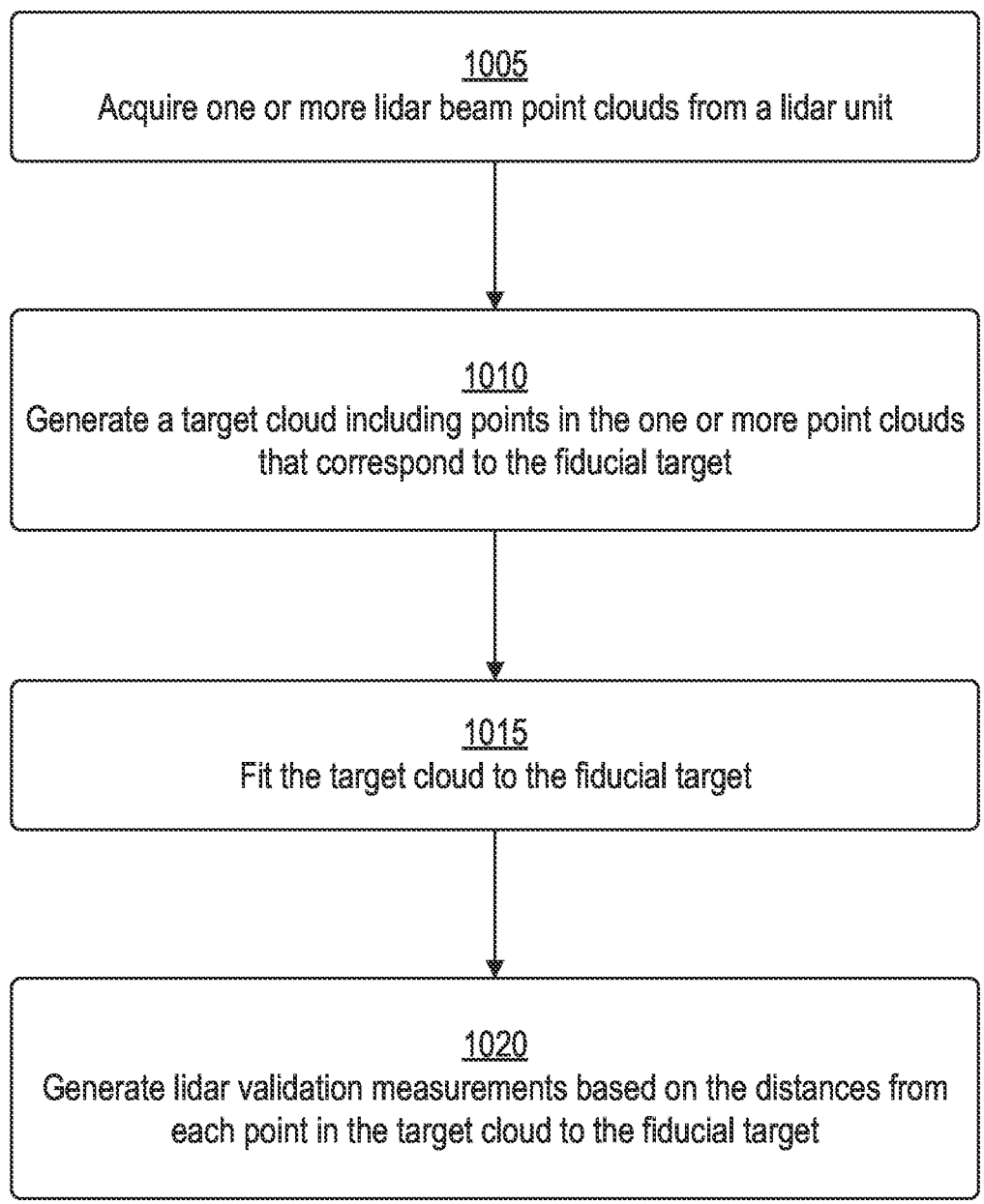
FIG. 10 is a flow diagram illustrating a method for generating lidar validation measurements, in accordance with various aspects of the subject technology.

FIG. 10 is a flow diagram illustrating a method for generating lidar validation measurements, in accordance with various aspects of the subject technology. The method may be performed by, for example, a validation system. At operation 1005, the system is configured to acquire one or more point clouds from a lidar unit. Each point cloud may be a representation of a scene according to a laser in the lidar unit and the scene may include a fiducial target.

At operation 1010, the system may select points in the one or more point clouds that correspond to the fiducial target to generate a target cloud and fit the target cloud to a geometric representation of the fiducial target at operation 1015. At operation 1020, the system may generate lidar validation measurements based on the distances from each point in the target cloud to the fiducial target.

Based on validation measurements that are generated, various lidar sensors may be compared to determine whether a preferred lidar sensor or determine whether a lidar sensor is adequate for use on a vehicle. For example, based on the validation measurements, a make and model of lidar sensor may be selected for use. Alternatively or additionally, one or more units of lidar sensors of a particular make and model may be selected for installation while others that do not meet standards may be remain unused and/or returned to the manufacturer.

By generating objective validation measurements, various aspects of the subject technology enable only validated lidar sensors to be used, thereby increasing the overall accuracy, consistency, and quality of the lidar sensors used. Furthermore, the validated lidar sensors provide an increased confidence that the lidar sensors will perform as intended. These are especially important in applications where the performance of lidar sensors is critical. One such application is in the field of autonomous vehicles, where the performance of lidar sensors is critical to functions such as identifying objects, performing vehicle maneuvers, ensuring passenger safety, among others. Autonomous vehicles typically rely heavily on lidar sensors and satisfactory operation of these sensors is of critical importance.

Figure 11:
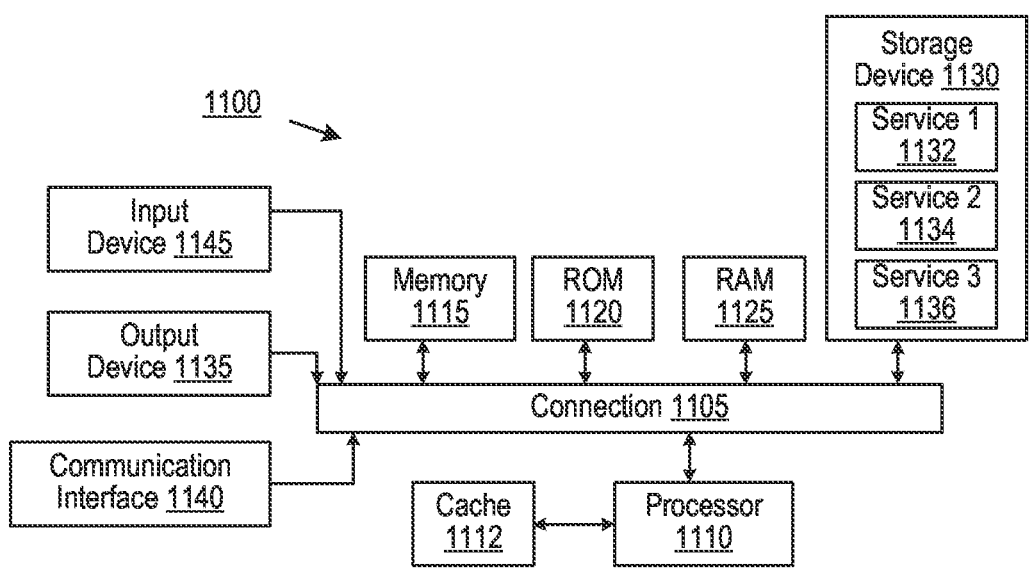
FIG. 11 shows an example of computing system, in accordance with various aspects of the subject technology.

FIG. 11 shows an example of computing system 1100, which can be for example any computing device making up internal computing system 110, remote computing system 150, potential passenger device executing rideshare app 170, or any component thereof in which the components of the system are in communication with each other using connection 1105. Connection 1105 can be a physical connection via a bus, or a direct connection into processor 1110, such as in a chipset architecture. Connection 1105 can also be a virtual connection, networked connection, or logical connection.

In some embodiments, computing system 1100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache of high-speed memory 1112 connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms known to those of skill in the art. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some embodiments, a hardware service that performs a particular function can include the software component stored in a computer-readable medium in connection with the necessary hardware components, such as processor 1110, connection 1105, output device 1135, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   obtaining a first set of lidar sensor data from a lidar unit in a first position;
   transmitting instructions to the lidar unit to rotate the lidar unit to a second position;
   obtaining a second set of lidar sensor data from the lidar unit in the second position;
   converting the first set of lidar sensor data and the second set of lidar sensor data into one or more point clouds;
   generating, based on points in one or more point clouds, a first target cloud that corresponds to an object, wherein the one or more point clouds are based on the first set of lidar sensor data and the second set of lidar sensor data, wherein each point cloud is a representation of a scene according to at least one laser in the lidar unit; and performing a rigid body operation to minimize a sum of distances from each point in the first target cloud to the object.

2. The method of claim 1, further comprising:
identifying a vector that minimizes the distances between each point in the first target cloud and the object.

3. The method of claim 2, wherein performing the rigid body operation is based on identification of the vector.

4. The method of claim 1, further comprising:
generating a first set of lidar validation measurements based on the distances between each point in the first target cloud to the object.

5. The method of claim 1, further comprising:
filtering points in the one or more point clouds that correspond to the object for inclusion in the first target cloud.

6. The method of claim 1, wherein the lidar unit includes one or more arrays of lasers.

7. The method of claim 1, further comprising:
representing the rigid body operation as a vector.

8. A non-transitory computer-readable medium storing instructions thereon, wherein the instructions, when executed by one or more processors, cause the one or more processors to perform operations comprising:
obtaining a first set of lidar sensor data from a lidar unit in a first position;
transmitting instructions to the lidar unit to rotate the lidar unit to a second position;
obtaining a second set of lidar sensor data from the lidar unit in the second position;
converting the first set of lidar sensor data and the second set of lidar sensor data into one or more point clouds;
generating, based on points in one or more point clouds, a first target cloud that corresponds to an object, wherein the one or more point clouds are based on the first set of lidar sensor data and the second set of lidar sensor data, wherein each point cloud is a representation of a scene according to at least one laser in the lidar unit; and
performing a rigid body operation to minimize a sum of distances from each point in the first target cloud to the object.

9. The non-transitory computer-readable medium of claim 8, wherein the instructions, when executed by the one or more processors, cause the one or more processors to further perform operations comprising:
identifying a vector that minimizes the distances between each point in the first target cloud and the object.

10. The non-transitory computer-readable medium of claim 9, wherein performing the rigid body operation is based on identification of the vector.

11. The non-transitory computer-readable medium of claim 8, wherein the instructions, when executed by the one or more processors, cause the one or more processors to further perform operations comprising:
generating a first set of lidar validation measurements based on the distances between each point in the first target cloud to the object.

12. The non-transitory computer-readable medium of claim 8, wherein the instructions, when executed by the one or more processors, cause the one or more processors to further perform operations comprising:
filtering points in the one or more point clouds that correspond to the object for inclusion in the first target cloud.

13. The non-transitory computer-readable medium of claim 8, wherein the lidar unit includes one or more arrays of lasers.

14. The non-transitory computer-readable medium of claim 8, wherein the instructions, when executed by the one or more processors, cause the one or more processors to further perform operations comprising:
representing the rigid body operation as a vector.

15. A system comprising:
a processor; and
a non-transitory memory storing computer-executable instructions thereon, wherein the computer-executable instructions, when executed by the processor, cause the processor to perform operations comprising:
obtaining a first set of lidar sensor data from a lidar unit in a first position;
transmitting instructions to the lidar unit to rotate the lidar unit to a second position;
obtaining a second set of lidar sensor data from the lidar unit in the second position;
converting the first set of lidar sensor data and the second set of lidar sensor data into one or more point clouds;
generating, based on points in one or more point clouds, a first target cloud that corresponds to an object, wherein the one or more point clouds are based on the first set of lidar sensor data and the second set of lidar sensor data, wherein each point cloud is a representation of a scene according to at least one laser in the lidar unit; and
performing a rigid body operation to minimize a sum of distances from each point in the first target cloud to the object.

16. The system of claim 15, wherein the computer-executable instructions, when executed by processor, cause the processor to further perform operations comprising:
identifying a vector that minimizes the distances between each point in the first target cloud and the object.

17. The system of claim 16, wherein performing the rigid body operation is based on identification of the vector.

18. The system of claim 15, wherein the computer-executable instructions, when executed by processor, cause the processor to further perform operations comprising:
generating a first set of lidar validation measurements based on the distances between each point in the first target cloud to the object.

19. The system of claim 15, wherein the computer-executable instructions, when executed by processor, cause the processor to further perform operations comprising:
filtering points in the one or more point clouds that correspond to the object for inclusion in the first target cloud.

20. The system of claim 15, wherein the lidar unit includes one or more arrays of lasers.

* * * * *